H. FORESMAN.

Raking Attachment for Harvesters.

Reissued June 16, 1863.

No. 1,496.

Witnesses:
J. H. Osborne
D. Osborne

Inventor:
O. H. Burdick
H. Foresman

N. PETERS, Photo-Lithographer, Washington, D. C.

UNITED STATES PATENT OFFICE.

O. H. BURDICK, OF AUBURN, NEW YORK, ASSIGNEE OF HUGH FORESMAN, OF ENON, OHIO.

IMPROVEMENT IN RAKING ATTACHMENTS FOR HARVESTERS.

Specification forming part of Letters Patent No. 14,861, dated May 13, 1856; Reissue No. 1,496, dated June 16, 1863.

*To all whom it may concern:*

Be it known that HUGH FORESMAN, of Enon, in the county of Clarke and State of Ohio, did invent certain new and useful Improvements in a Self-Raking Attachment for Harvesting-Machines; and I do hereby declare that the following is a full, clear, and exact description of the operation of the same, reference being had to the accompanying drawings, making a part of this specification, in which—

Figure 1:
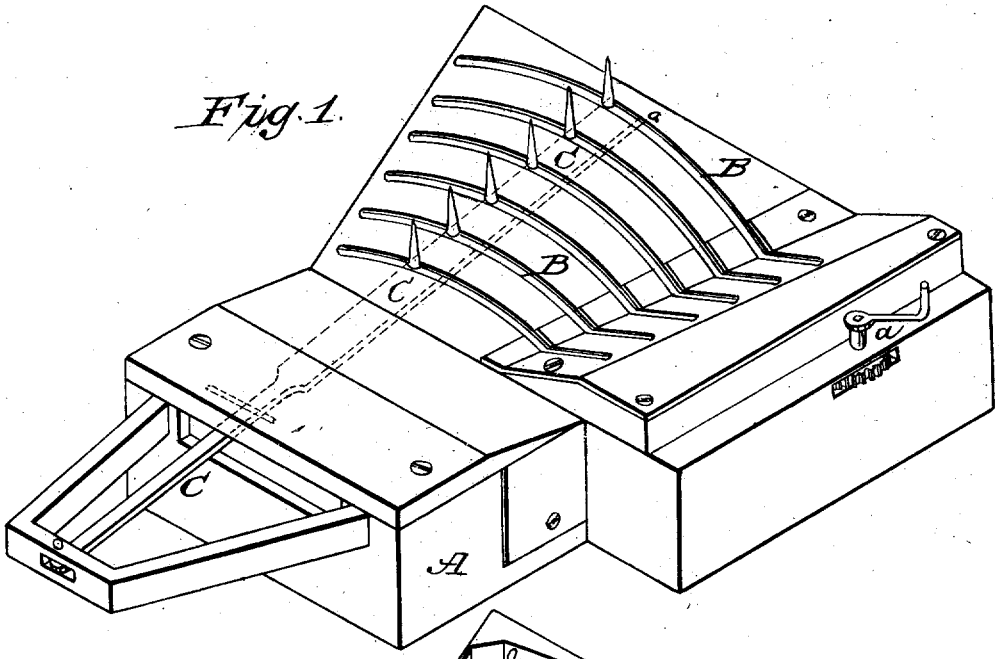
Figure 2:
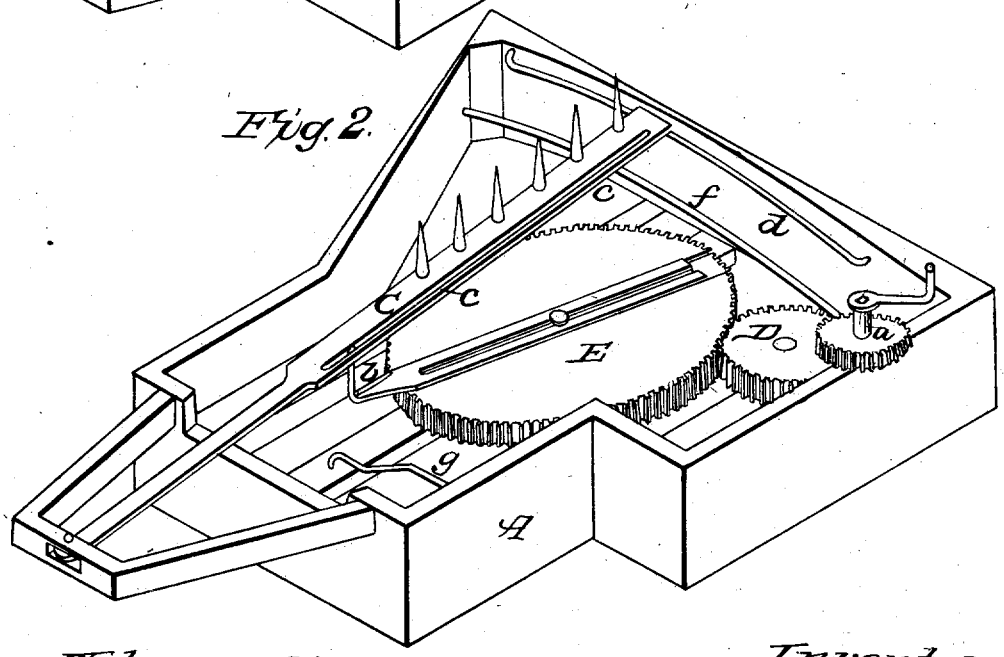

Figure 1 represents a perspective view of a platform of a harvesting-machine with the rake attached thereto and working thereon or therewith, and Fig. 2 represents the same with the cover or case that protects the mechanism removed to show the parts more distinctly.

The nature of this invention consists, first, in the combination of a revolving wheel and pin with a slotted rake-stale to give the rake its sweeping motion to clear the platform of the cut grain and to return for the next similar operation.

It further consists in the combination of a rake, receiving its sweeping motion by a revolving wheel and pin, with a raising and lowering device that brings it into action to clear the platform of the cut grain, and causes it to return without contact with the platform for the next sweeping operation.

It further consists in combining with a sweeping-rake an adjustable crank-pin for varying the sweep of the rake as circumstances may require.

To enable others skilled in the art to make and use this invention, I will proceed to describe the same with reference to the drawings.

A represents the front part of the platform, to which the cutting apparatus is attached; and B, the delivery-point, where the gavel is swept off onto the ground. The rake-stale C is pivoted at its rear end, so that it may sweep the platform, and then return out of reach of the grain that is on or falling on the platform.

The rake C′, as shown, is operated as follows: Motion is communicated to a shaft, *a*, that carries a pinion that works in and turns a wheel, D, which wheel D in turn gears with and turns a cogged gear, E, to which an adjustable pin, *b*, serving as a crank-pin, is attached, said pin *b* working in a long slot, *c*, in or on the rake-stale C. By this mechanism the rake is swept across the platform; but it is necessary that the rake after it has swept the grain off the platform should return out of reach of the grain that is falling on the platform. For this purpose the rake at the end of its delivery-sweep is brought away from the platform, and returns out of reach of the grain until at or near the point where it is to begin again to clear the platform, when it is run into its sweeping position. To effect this purpose the following devices were used by the said FORESMAN: The forward end of the rake rested and moved on a guide, *d*, until it arrived at the end of its sweep, and then dropped, aided by a spring, *e*, onto another guide, *f*, on which it returned to the place for beginning the next sweeping operation, where a raising cam or mechanism, *g*, restored it to its proper position for clearing the platform again. Thus one revolution of the cog-wheel E traversed the rake first across the platform to clear it, and back again out of reach of the platform, and raised and lowered it at the end of each traverse, all of which were effected by the pin and slot and the raising and lowering mechanism above described.

The rake has been described as receiving its motion through the shaft *a*, which is driven from the main driving-wheel of the machine; but the motion to drive the rake may be taken from other moving part of the machine through the intervention of the well-known mechanical devices used for such purposes.

Having thus fully described the nature and object of this invention, what is claimed therein as new and as the invention of the said HUGH FORESMAN is—

1. In combination with a rake receiving its sweeping motion from a revolving wheel and pin, a raising and lowering mechanism that brings the rake into position to clear the platform of the cut grain, and returns it out of reach of the platform for the next sweeping operation, substantially as described.

2. In combination with a sweeping-rake, an adjustable crank-pin for varying the sweep thereof, in the manner and for the purpose described.

3. The combination of a revolving wheel and pin with a slotted rake-stale to give the rake its sweeping motion to clear the platform and to return for the next sweeping motion, substantially as described.

O. H. BURDICK.

Witnesses:
J. H. OSBORNE,
D. M. OSBORNE.